July 26, 1938.  A. F. COULTER  2,124,944
BRAKE BEAM LEVELER
Filed July 31, 1936
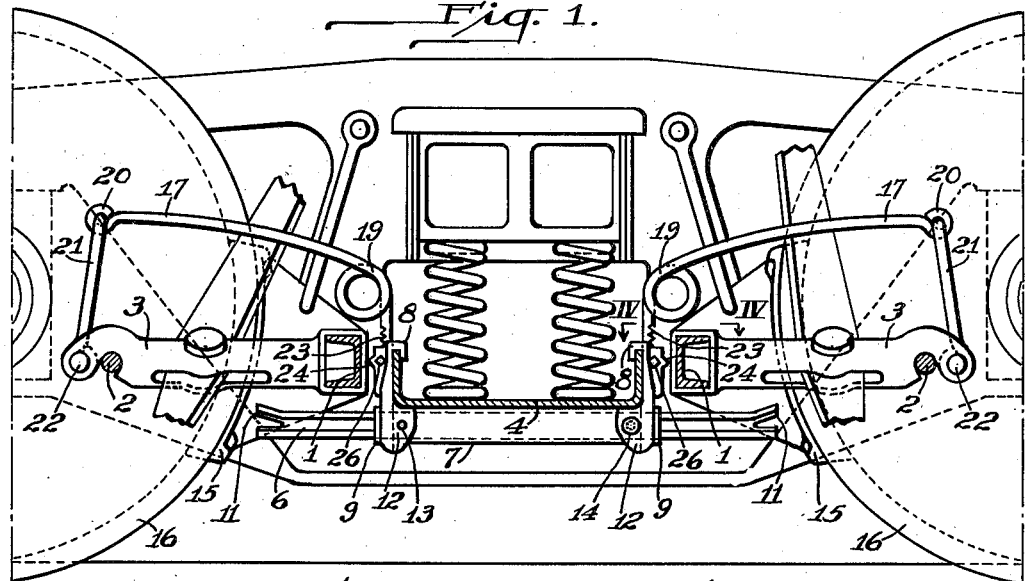
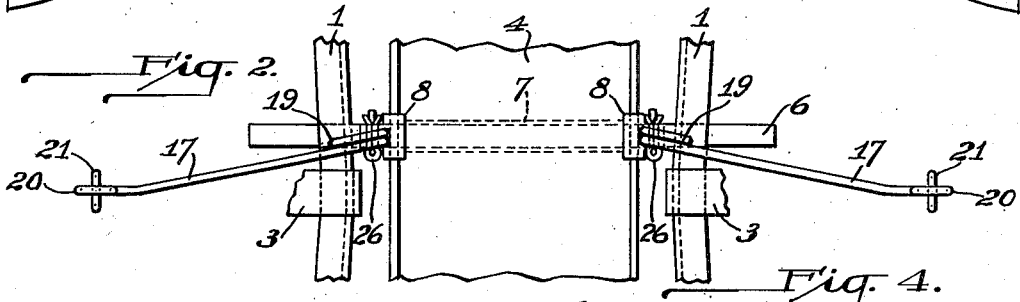
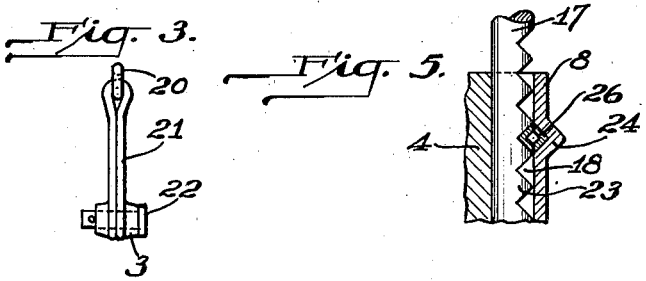
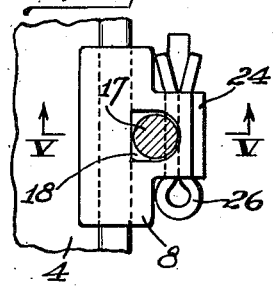
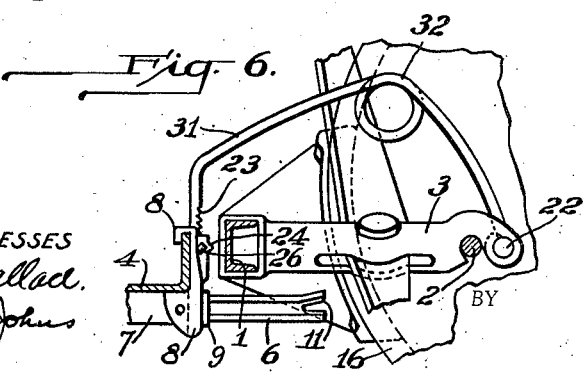
INVENTOR.
Andrew F. Coulter
BY Brown, Critchlow & Flick
his ATTORNEYS.
WITNESSES
A B Wallach
E. O. Johns Patented July 26, 1938

2,124,944

UNITED STATES PATENT OFFICE 2,124,944

BRAKE BEAM LEVELER

Andrew F. Coulter, Wilkinsburg, Pa., assignor to Frederic Schaefer, Pittsburgh, Pa.

Application July 31, 1936, Serial No. 93,591

7 Claims. (Cl. 188—213)

This invention relates to railway brake beam levelers, and has among its objects the provision of a brake beam leveler which is adapted to be stressed laterally as well as vertically, which is readily attached to and detached from the spring plank of a car truck, which is vertically adjustable, which biases the brake beam toward the spring plank, and which is undisturbed by the removal of the brake beam from the truck.

The invention is illustrated in the accompanying drawing in which Fig. 1 is a fragmentary vertical section through a railway car truck taken transversely through the spring plank with the brakes applied; Fig. 2 is a fragmentary plan view of the spring plank and levelers; Fig. 3 is a view of the outer end of the brake beam strut and leveler; Fig. 4 is a horizontal view of the leveler-receiving bracket taken on the line IV—IV of Fig. 1; Fig. 5 is a vertical section through the bracket taken on the line V—V of Fig. 4; and Fig. 6 is a fragmentary vertical section through a spring plank and brake beam showing a modification of this invention.

In accordance with this invention a brake beam leveler is formed from a resilient rod the outer end of which is connected to the outer end of a brake beam strut and the inner end of which is connected to the spring plank of a railway car truck. Preferably, the inner end of the rod is supported in a socket formed in a bracket rigidly attached to the spring plank, and is provided with a series of teeth adapted to be engaged by a detachable pin extending transversely through one side of the socket for locking the rod therein in any desired vertical position. The bracket is advantageously one of those which supports the brake beam safety support. The leveler is so formed that it not only balances the brake beam, but also biases it toward the spring plank and thereby tends to keep the brake shoes from dragging against the wheels when the brakes are released.

Referring to Figs. 1 and 2 of the drawing, a brake beam formed of a compression member 1 and a tension member 2 spaced apart centrally by a strut 3 is disposed in the usual manner at each side of the spring plank or channel 4 of a railway car truck. To catch and support the brake beams in case they accidentally drop, a safety support is provided, preferably in the form of a rigid bar 6 that extends transversely of channel 4 in a tube 7 supported below the channel by brackets 8 the upper ends of which are bent over the flanges of the channel and secured thereto. The tube, which extends through openings in the lower ends of the brackets, is held in place by radial flanges 9 formed on its ends, and serves as a guide in which bar 6 is slidable as far as its distorted bifurcated end portions 11. The lower ends of brackets 8 have inwardly extending portions 12 provided with transverse openings 13 that register with like openings in the tube and in the safety bar. A detachable pin 14 inserted in either or both of these groups of openings holds the safety bar in operative position with its ends projecting outwardly beneath both brake beams. By removing the pin the safety bar can be moved longitudinally to withdraw either of its projecting ends from below a brake beam to permit the latter to be removed from the truck for repair or replacement.

Each brake beam is balanced or held level by a brake beam leveler to prevent the upper ends of the brake shoes 15 carried thereby from dragging against wheels 16 with any more force than their lower ends. Brake beams should be free to move lengthwise as well as laterally under certain conditions of use, but brake beam levelers known heretofore either tended to prevent longitudinal movement of the beams, or were weakened or broken by such movement. It is a feature of this invention that the leveler disclosed herein comprises a resilient metal rod 17, by which is meant an elongate member of any cross-sectional contour, preferably cylindrical, that adapts it to be flexed laterally as well as vertically. Such a leveler allows a brake beam to shift longitudinally when necessary and is not unduly stressed thereby.

Another feature of this invention resides in the connection of the leveler rods to the spring plank channel 4 and strut 3. Preferably, each safety support bracket 8 is provided in its upright portion with a downwardly extending socket 18 that may be formed by offsetting the central portion of the bracket to space it from the adjacent flange of the channel, as shown in Fig. 4. The socket slidably and snugly receives the depending inner end of the rod 17 and maintains it upright. Above the socket the rod is provided with a loop 19 to increase its resiliency and life, and the remainder of the rod extends outwardly from the spring plank to a point above the outer end of strut 3. The outer end of the rod is bent to form an eye 20 by which it is pivotally connected through a link 21 to a pin 22 extending transversely through the end of the strut (Fig. 3). Eye 20 is disposed in a vertical plane spaced inwardly from pin 22 so that the brake beam tends to swing toward the spring plank when the brakes are released and to thereby hold the brake shoes away from the wheels.

A further feature of this invention is that leveler rod 17 is vertically adjustable for the purpose of adapting it to different types of brake rigging and to compensate for wear of the rigging. Accordingly, the depending inner end portion of the rod is preferably provided in its outer face with a series of vertically-spaced teeth 23, and the outer side wall of the socket is laterally offset to form a portion 24 the ends of which are provided with openings. As shown in Fig. 5, a removable pin 26 extends through these openings and between two teeth 23 for locking the rod in the socket. Preferably, the pin is a cotter pin rectangular in cross section to render it more suitable for reception by the teeth. If it is desired to raise or lower the leveler rod, pin 26 is removed, the rod is adjusted and the pin is replaced in engagement with the teeth in line with it.

In the modification shown in Fig. 6 the brake beam leveler consists of a single rod 31, instead of a rod and link, and the outer end of the rod is connected directly to the outer end of strut 3. The outer portion of the rod is stressed outwardly and downwardly when it is connected to the strut, whereby the leveler tends to move the brake beam toward the spring plank as well as to lift it. The rod is preferably provided with a loop 32 at the point of most strain, which in this embodiment is approximately midway between the ends of the strut, to increase the length of the portion taking the strain and thereby lengthen the life of the rod.

In case a brake beam safety support is not present, the rod-receiving socket can be formed in a bracket attached to the spring plank solely for that purpose.

A brake beam leveler constructed in accordance with this invention is simple in construction, and is durable and dependable because it is free to flex laterally when the brake beam moves lengthwise. Being attached to the spring plank the leveler does not have to be disconnected therefrom to permit the underlying brake beam to be removed from the truck. The method of connecting the leveler rod to the spring plank allows it to be readily disconnected at will or adjusted vertically as necessary. Furthermore, the rod not only serves as a brake beam leveler, but biases the beam toward the spring plank when the brakes are released and thereby tends to hold the shoes away from the wheels.

According to the provisions of the patent statutes, I have explained the principle and construction of my invention and have illustrated and described what I now consider to represent its best embodiment. However, I desire to have it understood that, within the scope of the appended claims, the invention may be practiced otherwise than as specifically illustrated and described.

I claim:

1. The combination with a railway truck spring plank and a brake beam strut extending laterally from the plank, of a bracket connected to one side of the plank adjacent said strut and provided with a downwardly extending socket, a resilient rod disposed in said socket and having a portion extending laterally away from the plank, and means for connecting said last portion to the outer end of said strut.

2. The combination with a railway truck spring plank and a brake beam strut extending laterally from the plank, of a bracket connected to one side of the plank adjacent said strut and provided with a downwardly extending socket, an elongate resilient member having an upright end portion disposed in said socket and having a portion extending laterally away from the plank, means for connecting said last portion to the outer end of said strut, and means for adjusting said upright portion of said member vertically in said socket.

3. The combination with a railway truck spring plank and a brake beam strut extending laterally from the plank, of a bracket connected to one side of the plank adjacent said strut and provided with a downwardly extending socket, a resilient rod having a substantially upright end portion disposed in said socket and having a portion extending laterally away from the plank, means for pivotally connecting said last portion to the outer end of said strut, and means for vertically adjusting said upright portion of the rod in said socket.

4. The combination with a railway truck spring plank and a brake beam strut extending laterally from the plank, of a bracket connected to one side of the plank adjacent said strut and provided with a downwardly extending socket, a resilient rod having an upright end portion disposed in said socket and provided along one side with a series of vertically-spaced teeth, said socket being provided adjacent said teeth with lateral openings, and a pin disposed in said openings for selectively engaging said teeth to permit said upright portion to be adjusted vertically, said rod also having a portion extending laterally away from the plank, and means for pivotally connecting said last portion to the outer end of said strut.

5. The combination with a railway truck spring plank and a brake beam strut extending laterally from the plank, of a bracket connected to one side of the plank adjacent said strut and provided with a downwardly extending socket, a resilient rod having an upright end portion disposed in said socket and provided along one side with a series of vertically-spaced teeth, said socket being provided adjacent said teeth with lateral openings, a pin disposed in said openings for selectively engaging said teeth to permit said upright portion to be adjusted vertically, said rod also having a portion extending laterally away from the plank, and a link pivotally connecting the outer ends of said last portion and said strut for biasing them toward each other.

6. The combination with a railway truck spring plank and a brake beam strut extending laterally from the plank, of a bracket connected to one side of the plank adjacent said strut and provided with a downwardly extending socket, a resilient rod having an upright end portion disposed in said socket and provided along one side with a series of vertically-spaced teeth, said socket being provided adjacent said teeth with lateral openings, and a pin disposed in said openings for selectively engaging said teeth to permit said upright portion to be adjusted vertically, said rod also having a portion extending laterally away from the plank, and a link pivotally connecting the outer ends of said last portion and said strut for biasing them toward each other, the upper end of said link being disposed in a vertical plane spaced inwardly of its lower end.

7. The combination with a railway truck spring plank and a brake beam strut extending laterally from the plank, of a bracket connected to one side of the plank adjacent said strut and provided with a downwardly extending socket, and a resilient rod having a substantially upright end portion disposed in said socket, a portion extending laterally away from the plank, and an integral portion extending downwardly from the outer end of said lateral portion for connecting it to the outer end of said strut, said downwardly extending portion biasing said strut toward said spring plank.

ANDREW F. COULTER.